No. 853,876. PATENTED MAY 14, 1907.
C. HARDING.
SHEPHERD'S CROOK.
APPLICATION FILED APR. 9, 1906.

Witnesses
H. A. Robinette,
G. Ayres.

Inventor
Charles Harding

By Marion & Marion
Attorneys

UNITED STATES PATENT OFFICE.

CHARLES HARDING, OF FORESTGROVE, MONTANA, ASSIGNOR TO A. JACKMAN, OF LEWISTOWN, MONTANA.

SHEPHERD'S CROOK.

No. 853,876.	Specification of Letters Patent.	Patented May 14, 1907.

Application filed April 9, 1906. Serial No. 310,721.

*To all whom it may concern:*

Be it known that I, CHARLES HARDING, a citizen of the United States, residing at Forestgrove, in the county of Fergus and State of Montana, have invented certain new and useful Improvements in Shepherd's Crooks, of which the following is a specification.

My invention relates to an improved form of shepherd's crook, and it consists in the constructions and combinations herein described and claimed.

The objects of my invention are to provide a convenient and durable form of crook capable of securely holding the sheep without danger of injury thereto.

Figure 1:
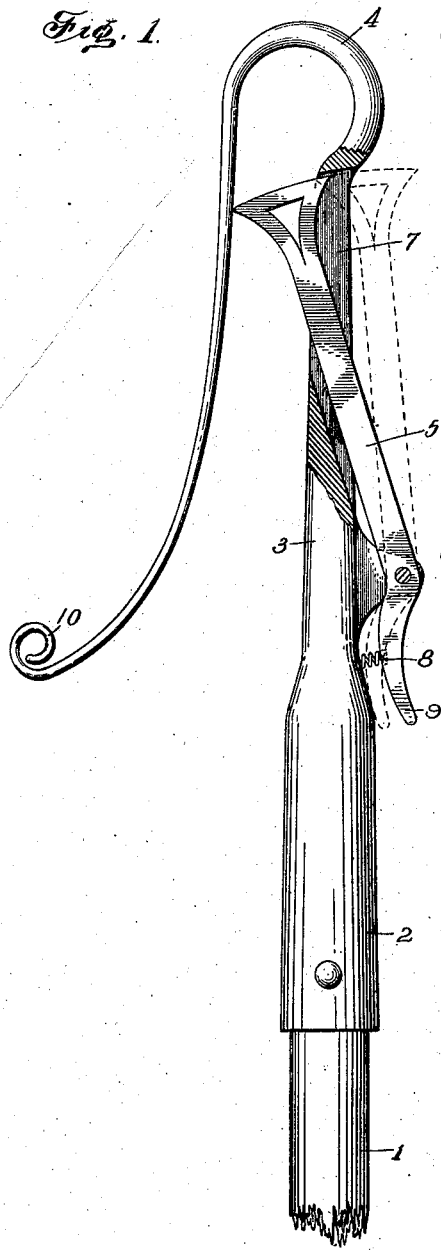
Figure 2:
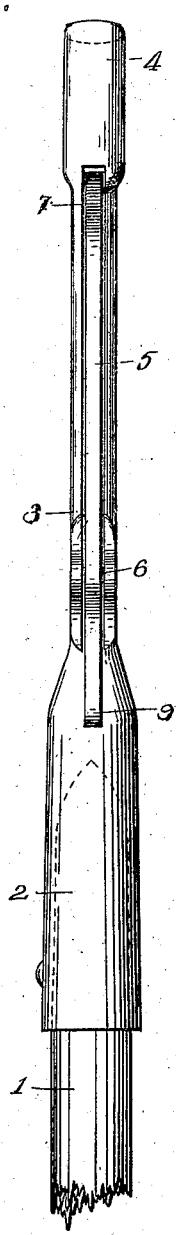

In the accompanying drawings, forming a part of this application and in which similar reference symbols indicate corresponding parts in the several views: Figure 1 is a side elevation, partially in section, illustrating one embodiment of my invention, and Fig. 2 is a rear elevation of the construction shown in Fig. 1.

Referring to the drawings, 1 indicates any convenient form of staff, secured in any usual manner in the shank 2 of the crook. The body portion 3 of the crook carries a hook portion 4, the outer end of which flares outwardly to facilitate bringing the crook into engagement with the leg of a sheep, and terminates in a roll 10 to strengthen the end of the hook and prevent injury to a sheep during its use.

A locking lever 5 is pivoted at 6 in lugs 11 on the body portion of the crook, in position to swing through a slot 7 in said body portion for positively closing the hook portion 4. A spring 8 is shown engaging the outer end of the locking lever for normally maintaining it in its closed, or locking, position.

The inner end of the locking lever is shown formed substantially in an arc about its pivotal support 6, thereby obviating danger of the lever becoming jammed in its locked position and enabling it to be readily swung outward for releasing a sheep.

As shown in the drawings, the locking lever is released by pressing down on its outer end 9, thereby swinging said lever against the tension of the spring 8 into the position indicated by broken lines in Fig. 1. If desired, a cord could be attached to the outer end 9 of the lever and led to the end of the staff 1, thereby enabling the sheep to be released by the operator at the end of the staff.

Having thus described my invention, what I claim as new, and desire to secure by Letters Patent, is:—

1. A shepherd's crook comprising a slotted body portion formed with a shank constituting a shaft attachment, a hook portion, and a locking lever pivotally supported on said body portion at the rear of said slot and arranged to swing inwardly through said slot for positively closing the hook portion, the inner end of said lever formed substantially in an arc about said pivotal support, substantially as described.

2. A shepherd's crook comprising a slotted body portion formed with a shank constituting a shaft attachment, a hook portion, lugs extending from the outer surface of said body portion, and a locking lever pivotally supported in said lugs and arranged to swing inwardly through said slot into contact with said hook portion, the inner end of said lever formed substantially in an arc about said pivotal support, substantially as described.

In testimony whereof I affix my signature in presence of two witnesses.

CHARLES HARDING.

Witnesses:
H. F. KROPP,
JOHN AUGAS.